United States Patent [19]

Antrim

[11] 4,117,549
[45] Sep. 26, 1978

[54] EXTRUDER SEAL
[75] Inventor: Richard Douglas Antrim, Newtown, Conn.
[73] Assignee: USM Corporation, Farmington, Conn.
[21] Appl. No.: 815,367
[22] Filed: Jul. 13, 1977
[51] Int. Cl.² .............................................. B29B 1/06
[52] U.S. Cl. ...................................... 366/99; 366/149
[58] Field of Search ........................... 366/149, 79–91, 366/96–99; 425/207, 378 R

[56] References Cited
U.S. PATENT DOCUMENTS
4,032,115  6/1977  Wintels et al. ..................... 366/90 X

*Primary Examiner*—Philip R. Coe
*Attorney, Agent, or Firm*—Donald N. Halgren; Richard B. Megley; Vincent A. White

[57] ABSTRACT

An extruder machine for processing of plastic materials, rubber or polymers in which a stationary casing is provided with a generally tubular bore having an inlet opening near one end thereof, and a discharge opening at the other end thereof. A generally cylindrical rotor is rotatably mounted in the bore of the casing. The casing is comprised of a pair of generally coaxially aligned spaced apart cylindrical members, having a length substantially longer than their diameters. A heating or a cooling fluid is passed in the spacing between the cylindrical members in a heat transfer relationship. Each pair of cylindrical members is provided with expansion/contraction joints to permit longitudinal expansion or contraction of the components with respect to one another. An annular flexible bellows seal is biasedly disposed within the spacing between the outer cylinder and the inner cylinder in a fluid tight relationship between the two to prevent leakage of cooling or heating fluid therefrom during periods of extruder operation.

6 Claims, 2 Drawing Figures

EXTRUDER SEAL

BACKGROUND OF THE INVENTION

1. Field of the Invention

This invention relates to extrusion machines for mixing and working compounds such as rubber, plastics, polymers, and more particularly the invention comprises a seal arrangement for retaining heat transfer fluid used in such a machine.

2. Prior Art

In the processing of plastic or polymer material, as practiced today, the cold material is introduced into the mixing, processing or fabricating apparatus wherein it is melted and transported through or into various die means to form the material into desired shapes. Due to differences in the physical characteristics, heat capacities, density, viscosities and other factors inherent in the various feed materials, the heating, melting/cooling zones must be adaptable to the vageries of various materials and their physical requirements.

Maintenance of these physical requirements can be difficult, especially in extruding machines that are very long, and which have high heat transfer requirements, of the order of 100–120 BTU/HR/FT$^2$/F°. The heat requirements for some polymers may lie in the range of 300° F.–700° F. Other materials may require cooling along various portions of their processing. The cooling temperatures required may be as low as 50° F. The fluid which would provide the heat transfer medium on the material being processed, could be at pressures as high as 800 psi.

Large extruding machines of the prior art have used adjustable packing as seals between longitudinally adjacent ends of coaxial portions of the extrusion machines. The adjustable packing is asbestos or teflon in between a collar and a flange of adjacent cylinders to keep them tight and leakproof. The present invention adapts a seal design used in sealing joints of adjacent pipe members. Heretofore, this concept has not been adapted to provide a pressure resistant leakproof seal for extruding machines. The seal of the pipes were containing an internal pressure from escaping outwardly. The present invention prevents heating fluid or cooling fluid from leaking from the outwardly disposed heat transfer fluid flow path, which is between a pair of coaxial spaced apart cylinders, into the material being processed within the bore of the extruding machine.

BRIEF SUMMARY OF THE INVENTION

The present invention provides an effective seal between the annular heat transfer fluid flow path outside of the inner liner of an extrusion machine, and the inner portion of that liner where the processing of the material is taking place. The seal comprises an expandable resilient annularly disposed bellows member sealingly arranged between an external shoulder on one end of an inner liner, and an annular cover plate which is attached to the end of an outer jacket. The outer jacket is disposed coaxially about the inner liner, and is spaced apart therefrom. The gap therebetween forming a heating/cooling fluid flow path for the heat transfer fluid.

It is an object of the present invention to provide a sealing arrangement for extruding machines, which will permit the use of hot or cold fluids as heat transfer mediums, while the seal itself will expand and contract as necessary, and which will provide retention of fluid and pressure between the liner and the jacket of the extruder.

BRIEF DESCRIPTION OF THE DRAWINGS

To more fully understand the objects and advantages of the present invention, reference may be had to the following drawings in which.

DESCRIPTION OF THE PREFERRED EMBODIMENT

Figure 1:
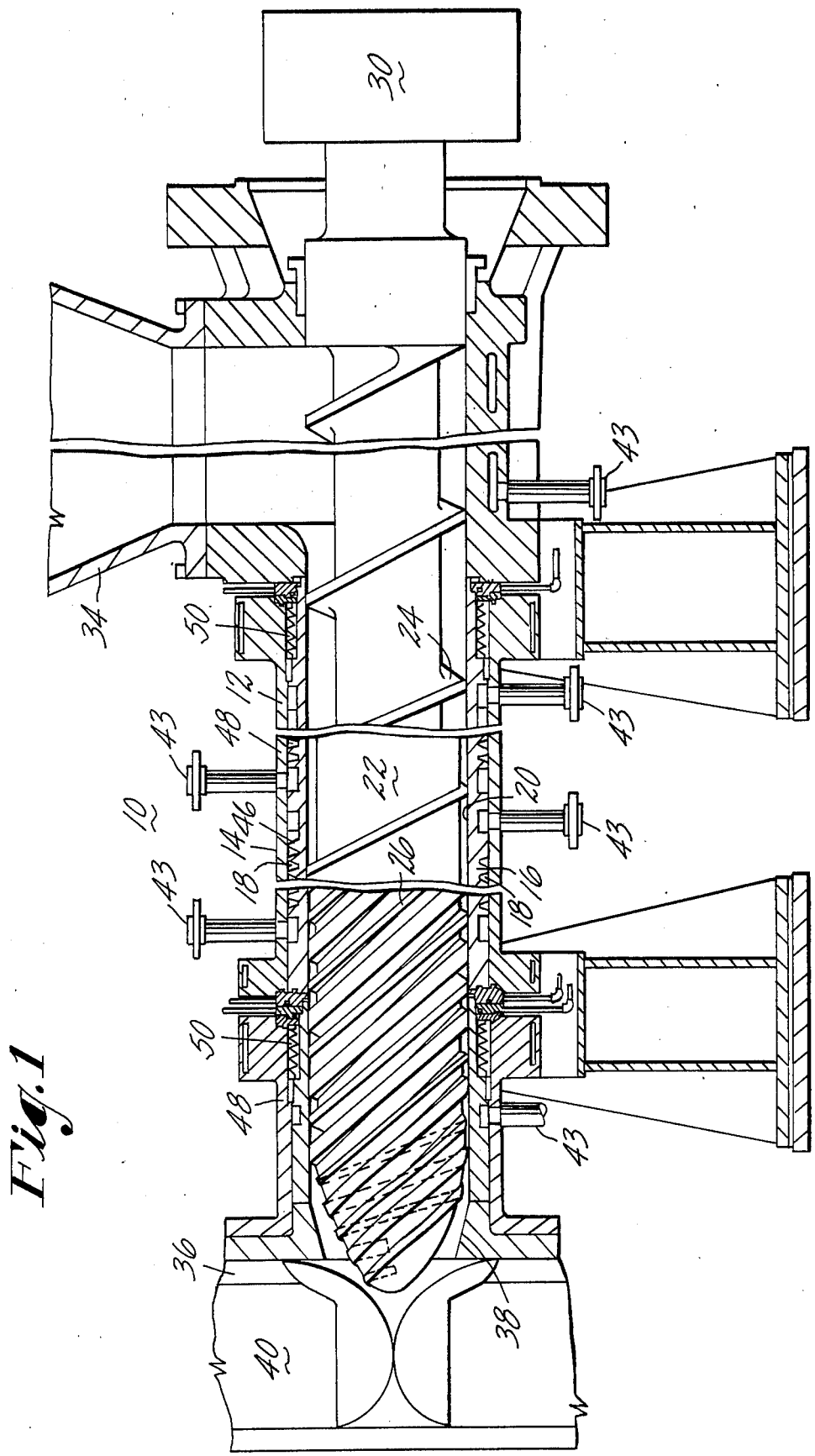
FIG. 1 is a sectional side view of a portion of an extruding machine constructed according to the principles of the present invention.

Referring now to the drawings, and particularly to FIG. 1, there is shown a mixing extruder 10. The mixing extruder 10 comprises a longitudinal body casing 12 having a cylindrically shaped outer jacket 14, and a wetted inner liner 16, coaxially disposed therewithin. The wetted inner liner 16 is spaced apart from outer jacket 14, the volume therebetween defining a heat transfer fluid flow path 18. The inner liner 16 has an inner surface which defines a bore 20 within which a rotor 22 is coaxially disposed. The rotor 22, in this example, has a primary helical screw 24 which comprises the "pumping" portion of the rotor 22, and a secondary helical screw flight 26 which comprises the "homogenizing" portion of the rotor 22, both of which permit the advance of material to be processed, through the body casing 12. The rotor 22, is adapted to be rotatively driven through a suitable motor and gearing means 30. A feed hopper 34 is disposed on the body casing 12 and provides communication with the bore 20. Material deposited in the hopper 34 is advanced by the rotating rotor 22 and screw flights 24 and 26, longitudinally through the bore 20 to an extruder head 36, which defines a discharge opening 38, which in turn discharges the material to a receiving apparatus 40 of a process line.

The material processed within the mixing extruder may be comprised of a rubber, a polymer or plastic substance or the like, which process requires a particular temperature, during mixing, through either a heating or a cooling thereof, for completion of the process. The temperature of the substance being processed may have to be cooled to as low a temperature as 50° F., or heated to a temperature of about 700° F. The heat transfer fluid flow path 18 promotes a heat transfer activity. The heat transfer fluid enters and leaves the portions of the casing 12 by an array of pipes 43 which are in communication with the heat transfer fluid flow path 18. The outer surface of the wetted inner liner 16 has disposed theron a spiral arrangement of grooves 46, in a continuation along the length thereof. The heat transfer fluid passing in those grooves 46, may be cool water, heated water, steam or other fluid having the desired properties.

The mixing extruder 10, because of its length, has a plurality of cylinders 48, joined at their longitudinal ends, to comprise the casing 12. To prevent leakage of any heat transfer fluid at the juncture of the cylinders 48, a seal 50 is disposed between the inner liner 16 and the outer jacket 14.

Figure 2:
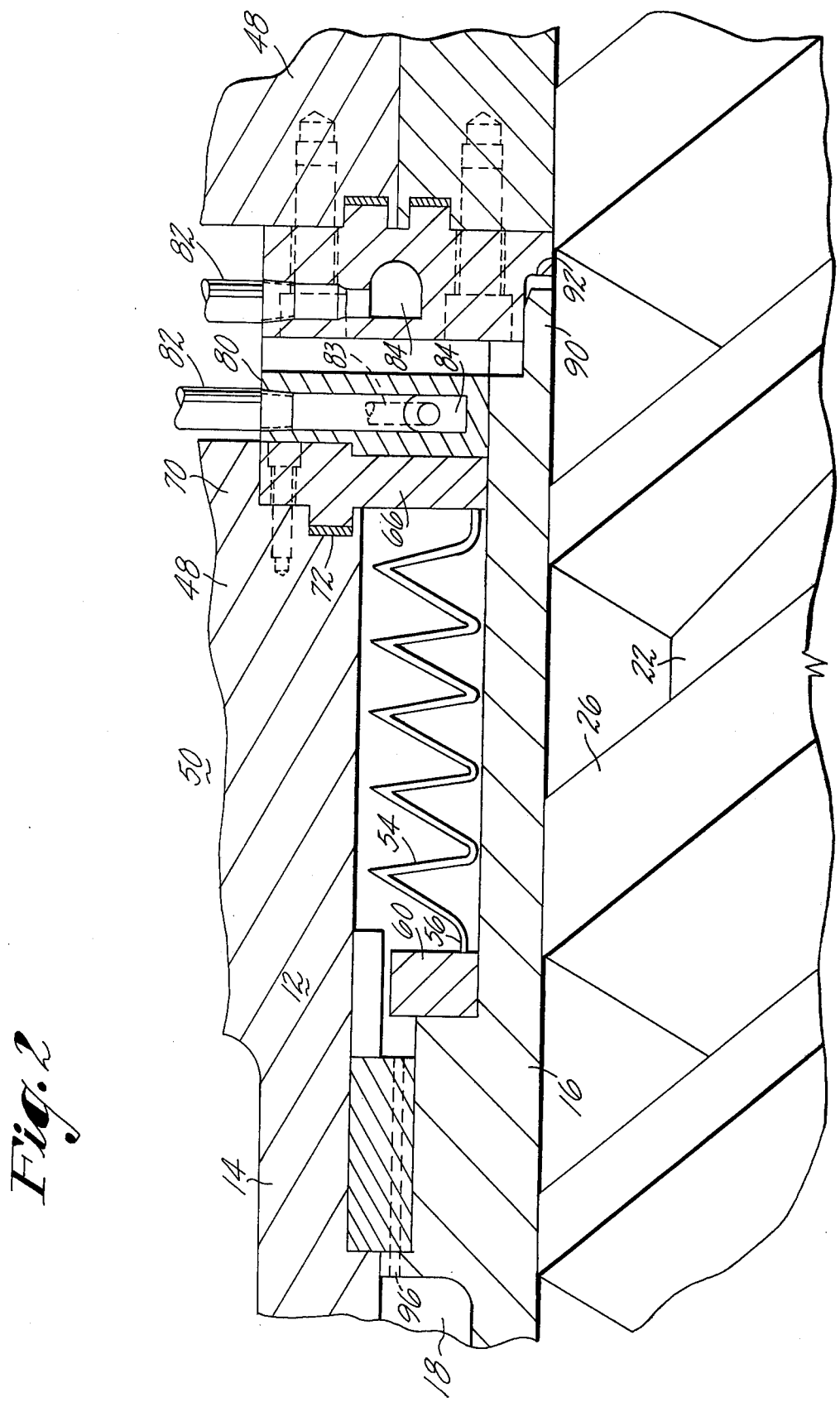
FIG. 2 is an enlarged view of a portion of FIG. 1.

The seal 50, shown more clearly in FIG. 2, is comprised of a resilient metal bellows 54. The bellows 54 is annularly disposed about at least one end of each inner liner 16 to permit longitudinal expansion and contraction thereof while preventing any cooling fluid leakage between the inner liner 16 and the outer jacket 14 into the bore 20 or outwardly at the juncture of the adjacent cylinders 48.

The bellows 54 is fixedly attached, by welding or the like, at a first end 56 to a ring member 60 which is itself attached to a flange on the outer side of the inner liner 16. The other end of the bellows 54 is also fixedly attached to an annularly shaped end cover plate 66. The end cover plate 66 is bolted to a radially directed flange 70 on the outer jacket 14 and is sealed therewith by a ring-shaped gasket 72. The radially inner edge of the end cover plate 66 is in a sliding relationship with the outer periphery of the inner liner 16. An annular spacer 80 is bolted to the cover plate 66 on the "bellows seal" end of this particular cylinder 48. The spacer 80 has a radially directed fluid supply tube 82 which feeds cooling fluid to an annular channel 84 disposed within the spacer 80. Cooling fluid is pumped through the supply tube 82 and the channel 84 to cool down and freeze any polymer or sustance that might leak out from within the casing 12 as it is being processed. It is pumped out a nearby egress tube 83, on the same spacer.

The inner liner 16 has a longitudinally extending lip 90 that slidingly mates with a groove 92 on the end cover 66 of its adjacent cylinder 48. The annular channel 84 may be disposed within the end cover plate 66 itself, as shown on the right-hand side of FIG. 2.

The volume of space disposed radially outwardly of the bellows 54 is in fluid communication with the heat transfer fluid flow path 18 through an array of channels 96, and also because of a slightly loose fit between the inner liner 16 and the outer jacket 14.

Thus it is seen that a flexible metal bellows 54 provides a seal against external pressure and potential loss of heat transfer fluid, steam, water, etc., while permitting an expansion of large longitudinal members because of temperature differentials therewithin, allowing an efficient processing of plastic or like material to be accomplished.

Having thus described my invention what I claim as new and desire to secure as Letters Patent of the United States is:

1. A mixing extruder for the processing of rubber, plastics and the like materials, said extruder including a housing with a generally cylindrical bore therein and a rotor rotatably mounted in the bore, the housing having a feed opening and a discharge opening at respective ends thereof, said housing also comprising:

at least one cylinder in a contiguous relationship with another portion of said extruder; wherein said cylinder has two ends, the cylinder comprising an outer jacket having an annular end plate fixed thereto, and an inner liner having a flange therearound, the outer jacket being coaxially disposed about and spaced apart from the inner liner, the inner surface of said liner defining said bore;

a heat transfer fluid flow channel disposed between said outer jacket and said inner liner of said cylinder; and a seal arrangement disposed on at least one end of said cylinder including a flexible annular bellows, said bellows having two ends, one end of said bellows being attached to said flange on said liner, the other end of said bellows being attached to the annular end plate fixed to said outer jacket.

2. A mixing extruder for the processing of rubber, plastics and like materials as recited in claim 1, wherein said annular end plate has a radially inner edge, and said inner liner has an outer surface, the inner edge of said annular end plate being disposed in a sliding relationship with the outer surface of said inner liner;

said inner liner having a lip in sliding sealing relationship with said other portion of said extruder.

3. A mixing extruder for the processing of rubber, plastics, and like materials as recited in claim 2, wherein said other portion of said extruder comprises another cylinder.

4. A mixing extruder for the processing of rubber, plastics and like materials as recited in claim 2, wherein an annular spacer is attached to said annular end plate on said end of said cylinder; said spacer having an annular chamber disposed therein, and having a cooling fluid supply and egress tube in communication with said annular chamber to provide cooling fluid adjacent the seal arrangement on the end of said cylinder and said other portion of said extruder to cool and retard the flow of any of said materials that might leak therebetween.

5. A mixing extruder for the processing of rubber, plastics and like materials, as recited in claim 2, wherein said heat transfer fluid flow channel is in fluid communication with the space between the radially outer side of said bellows and the radially inner side of said outer jacket.

6. A mixing extruder for the processing of rubber, plastics and like materials as recited in claim 2, wherein said end plate has an annular gasket between said end plate and its respective end of said outer jacket to provide a fluid tight seal therebetween.

* * * * *